US006178511B1

United States Patent
Cohen et al.

(10) Patent No.: US 6,178,511 B1
(45) Date of Patent: Jan. 23, 2001

(54) COORDINATING USER TARGET LOGONS IN A SINGLE SIGN-ON (SSO) ENVIRONMENT

(75) Inventors: Richard Jay Cohen; Richard Allen Forsberg; Paul A. Kallfelz, Jr., all of Austin; John Robert Meckstroth; Christopher James Pascoe, both of Pflugerville; Andrea Lynn Snow-Weaver, Austin, all of TX (US)

(73) Assignee: International Business Machines Corporation, Armonk, NY (US)

( * ) Notice: Under 35 U.S.C. 154(b), the term of this patent shall be extended for 0 days.

(21) Appl. No.: 09/070,461

(22) Filed: Apr. 30, 1998

(51) Int. Cl.[7] .................................................. G06F 11/30
(52) U.S. Cl. ......................................... 713/201; 713/202
(58) Field of Search ................................... 713/200, 201, 713/202

(56) References Cited

U.S. PATENT DOCUMENTS

| | | | |
|---|---|---|---|
| 4,604,686 | 8/1986 | Reiter et al. | 395/500 |
| 4,937,036 | 6/1990 | Beard et al. | 340/706 |
| 4,999,766 | 3/1991 | Peters et al. | 364/200 |
| 5,021,949 | 6/1991 | Morten et al. | 364/200 |
| 5,047,923 | 9/1991 | Elstner et al. | 364/200 |
| 5,226,172 | 7/1993 | Seymour et al. | 395/800 |
| 5,241,594 | 8/1993 | Kung | 380/4 |
| 5,329,619 | 7/1994 | Pageé et al. | 395/200.09 |
| 5,347,632 | 9/1994 | Filepp et al. | 395/200.09 |
| 5,369,778 | 11/1994 | San Soucie et al. | 395/800 |
| 5,434,918 | 7/1995 | Kung et al. | 380/25 |
| 5,442,342 | 8/1995 | Kung | 340/925.34 |
| 5,442,771 | 8/1995 | Filepp et al. | 395/200.08 |
| 5,564,043 | 10/1996 | Seifert | 695/614 |
| 5,579,479 | 11/1996 | Plum | 395/188.01 |
| 5,594,910 | 1/1997 | Filepp et al. | 395/800 |

FOREIGN PATENT DOCUMENTS

| | | | |
|---|---|---|---|
| 0751453 | 5/1996 | (EP) | G06F/1/00 |
| 2281645 | 3/1993 | (GB) | G06F/12/14 |

OTHER PUBLICATIONS

IBM Technical Disclosure Bulletin, "Network Signon Coordination Configuration," vol. 36, No. 12, Dec. 1993 (pp. 389–396).

IBM Technical Disclosure Bulletin, "Logon Assist for Multiple Logons," vol. 32, No. 8A, Jan. 1990 (pp. 303–305).

IBM Technical Disclosure Bulletin, "Temporary Global Passwords," vol. 36, No. 3, Mar. 1993 (pp. 451–453).

"Memco Software tries again with its automated Single Sign–On", Network Breifing, n285, May 28, 1997.*

* cited by examiner

Primary Examiner—Robert W. Beausoliel, Jr.
Assistant Examiner—Bryce Bonzo
(74) Attorney, Agent, or Firm—Jeffrey S. LaBaw; David H. Judson (57) ABSTRACT

A single sign-on (SSO) mechanism to enable a given user to access a target application on a target resource in a distributed computer enterprise. One or more configuration directives each identifying a given logon process and any associated methods required to access the target application on the target resource are stored in a preferably global-accessible database (CIM). For each of a set of users, a preferably global-accessible database (PKM) stores user-specific and application-specific information enabling the user to access and logon to one or more target resources. During a particular session, a logon coordinator (LC) mechanism coordinates given user information with the configuration directive to enable the given user to perform a given action with respect to the target application without specifying the given logon process and the application-specific information.

22 Claims, 6 Drawing Sheets

COORDINATING USER TARGET LOGONS IN A SINGLE SIGN-ON (SSO) ENVIRONMENT

BACKGROUND OF THE INVENTION

1. Technical Field

The present invention relates generally to accessing heterogeneous networks and reducing costs by increasing productivity for end-users and system administrators in an enterprise computer environment.

2. Description of the Related Art

With sprawling client-server systems growing daily, applications and information are spread across many PC networks, mainframes and minicomputers. In a distributed system environment connected by networks, a user must access many database systems, network systems, operating systems and mainframe applications. To use these systems and applications, the user must issue separate sign-on commands for each specific system or application. Indeed, it is not unusual for a user to encounter ten or more different login sessions during a working shift, and these often are different interfaces with different userid and authentication information, usually passwords. This places the user under a significant burden to remember and maintain this information.

It would be quite beneficial to provide a single sign-on (SSO) tool to enable authorized users to perform one initial sign-on to access a variety of networks, systems and applications. A single sign-on system should provide secure storage of user passwords, support for more than one user password, as well as support for multiple target logon methods. Each of these issues presents varying design considerations.

With respect to the first issue, there are multiple approaches to storing and managing passwords. One approach is to use the same password for all accessible systems/applications. This technique may weaken system security, however, because a compromised password in any of the systems or applications compromises the user's privileges on these systems and applications at the same time. Further, different sign-on mechanisms may have their own distinctive password requirements and, thus, it is problematic to use the same password for multiple targets.

Another approach to storing and managing passwords is password-mapping, which refers to using the user's primary password to encrypt all the user's secondary passwords. The encrypted passwords are stored in a local storage space accessible to the user (e.g., a local file, a readable/writable smartcard, and the like). Once the primary password is verified, the local system authentication module obtains the passwords for other sign-on systems and applications by decrypting the mechanism-specific encrypted password with the primary password. The security of this password-mapping scheme assumes that the primary password is the user's strongest password, and it also depends on the security of the local storage for the secondary passwords. If the secondary passwords are stored in an untrusted publicly accessible machine, an intruder is provided with opportunities for potential attacks. Moreover, although this approach is simple, the password file must be moved from machine to machine by the user to logon to more than one machine.

The target logon alternatives also influence the single sign-on system design. In particular, the method used for storing a user password heavily influences the design of target logon code. It is known to embed passwords in target specific logon scripts. This is how many "homegrown" single sign-on systems work today. This technique is the least extendible design because it ties passwords (and logon target code) to each machine the user uses. It is also hard to maintain passwords in this design because passwords need to be changed both in the applications and in the logon scripts. For a mobile user, the scripts need to be present on all machines the user might use. The overall security of this approach is thus very weak.

Another target logon alternative involves building in all the logon methods for every possible target to which any user may desire to logon. This "hardcoded" approach assumes that all workstations and applications are configured similarly and do not change. Because the logon methods are built into the solution, changes made to the logon methods require changes to the actual solution itself. This approach is costly and also is not very extensible.

These known approaches to secure password storage/management and target logon have yet to provide an adequate single sign-on solution. The present invention addresses and solves this problem.

BRIEF SUMMARY OF THE INVENTION

The present invention implements a single sign-on (SSO) mechanism that coordinates logois to local and remote resources in a computer enterprise with preferably one ID and password.

More specifically, this invention provides a single sign-on (SSO) framework that allow users to sign on to a client system one time entering ones password. The SSO framework then signs on to other applications on the user's behalf.

The SSO framework supports storage of all passwords and keys belonging to a user in secure storage (e.g., either in local storage, a centralized password service, a smartcard, or the like), so that the user needs to remember only one ID and password. Upon authentication, the SSO mechanism securely retrieves all the passwords for a user from the secure storage and automatically (i.e. without additional user intervention) issues sign-ons to each system/application the user is authorized to access.

The system framework preferably includes a number of modules including a configuration information manager (CIM), which includes information on how to logon to the applications configured on a given machine, a personal key manager (PKM), which includes information about users, systems and passwords they use to logon to those systems, and a logon coordinator (LC), which retrieves the user's passwords from PKM and uses them in conjunction with target-specific logon code to log users onto all their systems, preferably without and additional user intervention.

The CIM facilitates adding new logon methods as needed. Information is preferably stored in the CIM using "templates" referred to as program template files (PTFs). A given PTF thus is used to create entries in the CIM. This template mechanism enables an application vendor to specify how to log onto a given application. Thus, independent software vendors and others can easily plug their applications into the SSO framework without writing a large amount of code.

The SSO framework preferably implements a "data model" where information used to sign on to applications is kept in the separate PKM and CIM databases. Preferably, the PKM is globally accessible and stores user-specific information, and the CIM is locally accessible and stores application-specific information derived from PTF files. In operation, the logon coordinator (LC) accesses the PKM to obtain the user's information (e.g., which target systems and applications to which the user can sign-on), as well as the passwords and keys for those systems/applications. The LC then uses these passwords/keys, together with the target logon information found in the CIM, to sign-on to various target systems and applications. Sign-on is preferably based upon the target's own protocols and mechanisms as defined in the PTF.

Another objective of this invention is to allow applications to be plugged into the single sign-on (SSO) framework. According to the invention, preferably the program template file (PTF) is used to inform the single sign-on mechanism how to interact with a given application or subsystem to perform SSO-related operations. The PTF enables applications to be plugged into the SSO mechanism without changing the SSO code itself and without requiring any programs to be written to plug into the new application.

Still another more general objective of this invention is to provide a framework-type SSO mechanism that enables any kind of target to be user-specified.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof reference should be made to the following Detailed Description taken in connection with the accompanying drawings in which.

DETAILED DESCRIPTION OF THE PREFERRED EMBODIMENT

Figure 1:
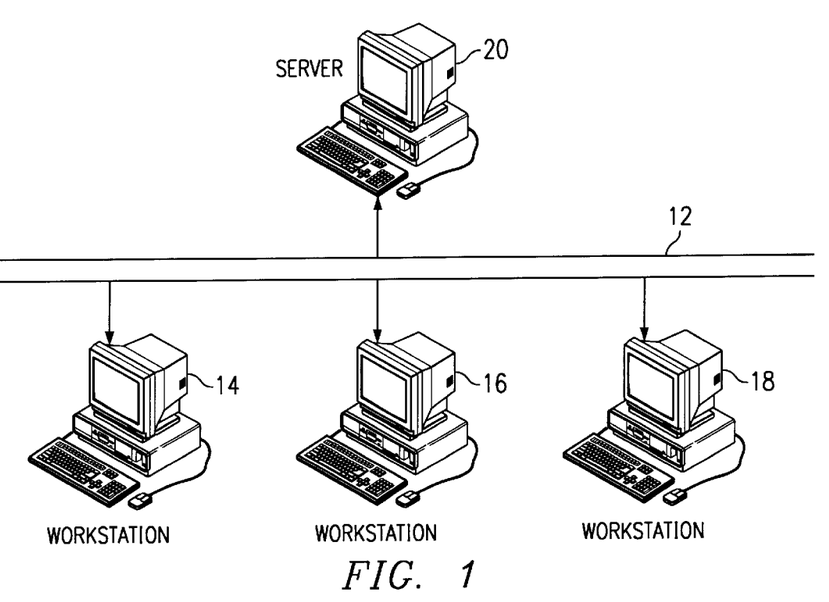
FIG. 1 is a computer enterprise environment in which the present invention may be implemented.

FIG. 1 illustrates a portion of a distributed computer environment domain 10 in which the present invention may be implemented. The signal sign-on (SSO) mechanism comprises both server 20 and client (runtime services) components 14, 16 and 18. For purposes of illustration, each of these are illustrated as a computer. It is also assumed that system users, log onto the domain via client machines in a known manner.

Preferably, the server and client services components of the SSO mechanism are implemented in a computer or "machine." For example, each server may be a RISC System/6000® (a reduced instruction set or so-called RISC-based workstation) running the AIX((Advanced Interactive Executive) operating systsm, preferably Version 4 or greater. Alternative servers include machines running Sun Solaris V 2.5.1 or Microsoft Windows NT 4.0.

Each client machine in the domain may be a computer such as a desktop machine or laptop. A typical client machine is an Intel x86 or Pentium®-based computer running Windows '95 or greater operating system. Alternatives include machines running OS/2® Warp 3.x or higher, or a Microsoft Windows NT workstation. Each client workstation typically supports TCP/IP and may include a network operating system (NOS). A typical client is a Novell Netware client (for Netware logons), an OS/2 LAN Server client (for OS/2 LAN Server logons), an OS/2 Warp Server client (for OS/2 Warp Server logons), or the like. These examples, however, are merely represertative and should not be construed to limit the invention in any way.

Many different types of target systems/applications are accessed using the single sign-on mechanism. These include distributed applications, databases, printers, and other resources throughout the enterprise. Representative systems and applications include, without limitation: 3270 and 5250-based applications, IBM OS/2 Lan Server 4.x and OS/2 Warp Server, Novell Netware 3.x and 4.x, Microsoft NT 4.0 Server, Databases (e.g., DB2, Oracle, Sybase, Informix, MS SQL Server), Lotus Notes 4.x, PeopleSoft applications, DCE applications written to conform to The Open Group (formerly known as the Open Software Foundation), and other applications. These examples, again, are merely representative.

Figure 2:
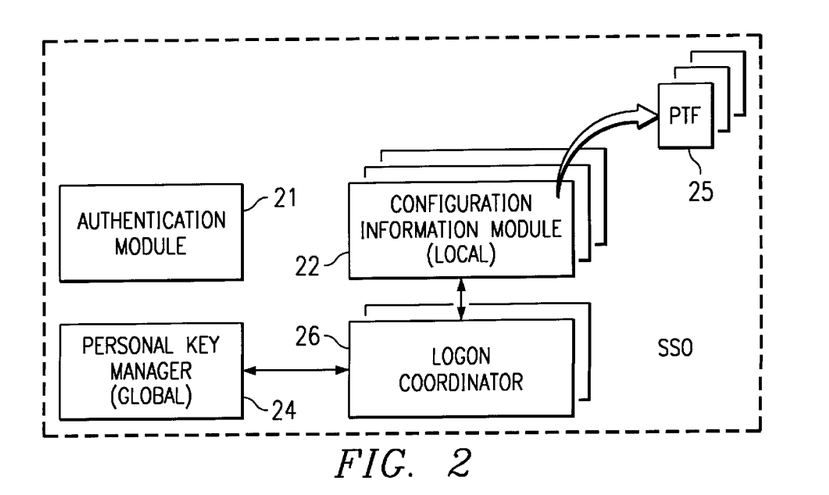
FIG. 2 is a block diagram of the main functional components of the inventive single sign-on (SSO) mechanism.

FIG. 2 illustrates the main components of the inventive single sign-on (SSO) mechanism of the present invention. They preferably include an authentication module 21, a configuration information manager (CIM) 22, a personal key manager (PKM) 24, and a Logon coordinator (LC) 26. In general, the authentication module 21 authenticates a given user to the remainder of the single sign-on (SSO) mechanism. On systems with local operating system security, the authentication mechanism 21 usually is integrated with the local OS authentication. The authentication module preferably supports different authentication mechanisms (e.g., secret key, smartcards, public/private key, and the like).

The configuration information manager (CIM) 22 includes information on how to logon to the applications configured on a given machine. Preferably, a CIM is supported on each client machine from which the SSO mechanism is provided. A given CEM typically is not globally accessible from other machines on the domain. Information in the CIM preferably is formatted according to a program template file (PTF) 25, as will be illustrated below in more detail. The CIM thus stores "configuration directives" identifying the given logon process and the methods required to access a particular application on the target resource. New logon methods nay be added using the PTF mechanism as will be seen.

The PKM 24 contains information about users, systems and passwords they use to logon to those systems. Preferably, PKM 24 is a secure, globally accessible repository that facilitates the single sign-on process. Although not meant to be limiting, with respect to a given user, the PKM (as will be described) preferably stores such information as a username, a set of one or more password(s), and any other application environment-specific information such as domain name, hostname, application name, and the like. Because this access information preferably is centralized in the PKM, users can access their target resources with one sign-on from any workstation. They can also manage their passwords from this one repository, as will also be seen.

To this end, the logon coordinator 26 functions generally to retrieve the user's passwords from the PKM and uses them in conjunction with the target specific logon code (identifiable from the CIM entries) to log users onto all (or some subset of) their systems, preferably without any additional user intervention. As will be described in more detail below, the LC also preferably maintains state information for a given user and application, called a "user target", to help coordinate and execute future operations.

According to the invention, the single sign-on mechanism preferably uses a "data model" where information used to sign on to applications is kept in two separate databases. The first database is the PKM 24, which is preferably a global database and is thus accessible from all client machines in a given domzlin. The PKM 24, as noted above, keeps user configuration information. The second database is the CIM 22, which is preferably a local database and is thus accessible only from the current client machine. The CIM need not be merely a local database, however. Each client machine from which the SSO support is provided runs a CIM. Thus, multiple instances of CIM 22 are illustrated in FIG. 2. Likewise, each client machine preferably also runs an instance of the logon coordinator 26.

Thus, for example, the PKM 24 contains user-specific application data which includes:

Target name—uniquely identifying a user "target"

Target type—specifies what type of "application"this target is;

Domain/Host/Application name—specifies application information, specific for this target;

User ID—specifies user id on target;

Key information—specifies the user's key (password) on the target;

User preferences—specifies user specific information for this target; and

Preferred program name—specifies a preferred CIM entry to use with this target.

The personal key manager 24 enables a given SSO user to manage all the passwords the user possesses in a secure and effective manner. According to the invention, each application, server, or system to which a user needs an ID/password pair to logon is defined as a "target". Using a GUI interface, the user creates a target in PKM corresponding to each real target to which the user can logon, and the user may create as many (or as few) targets as the capability of a specific PKM implementation allows (or that the user desires). Independent of any implementation, a generic PKM application programming interface (API) preferably is used by the SSO framework to create a new target, to update a target's data, to query a target's information (with or without passwords), and to delete an existing target.

The second database, the CIM 22, preferably contains entries derived from the program template files (PTFs). This database contains application (i.e. program) specific information, which includes (for example):

Target type—specifies what type of "application" the program is, i.e. what type of "application" can be accessed as a target using the program;

Default program—indicates if the CIM entry is the default program to use for a target of the given target type;

Specific application information—describes interfaces needed to perform operations like logon, logoff, and the like;

Program Preferences—indicates timeouts and retry counts; and

Interface directory—client-spiecific information on how to locate the application interface code.

Figure 3:
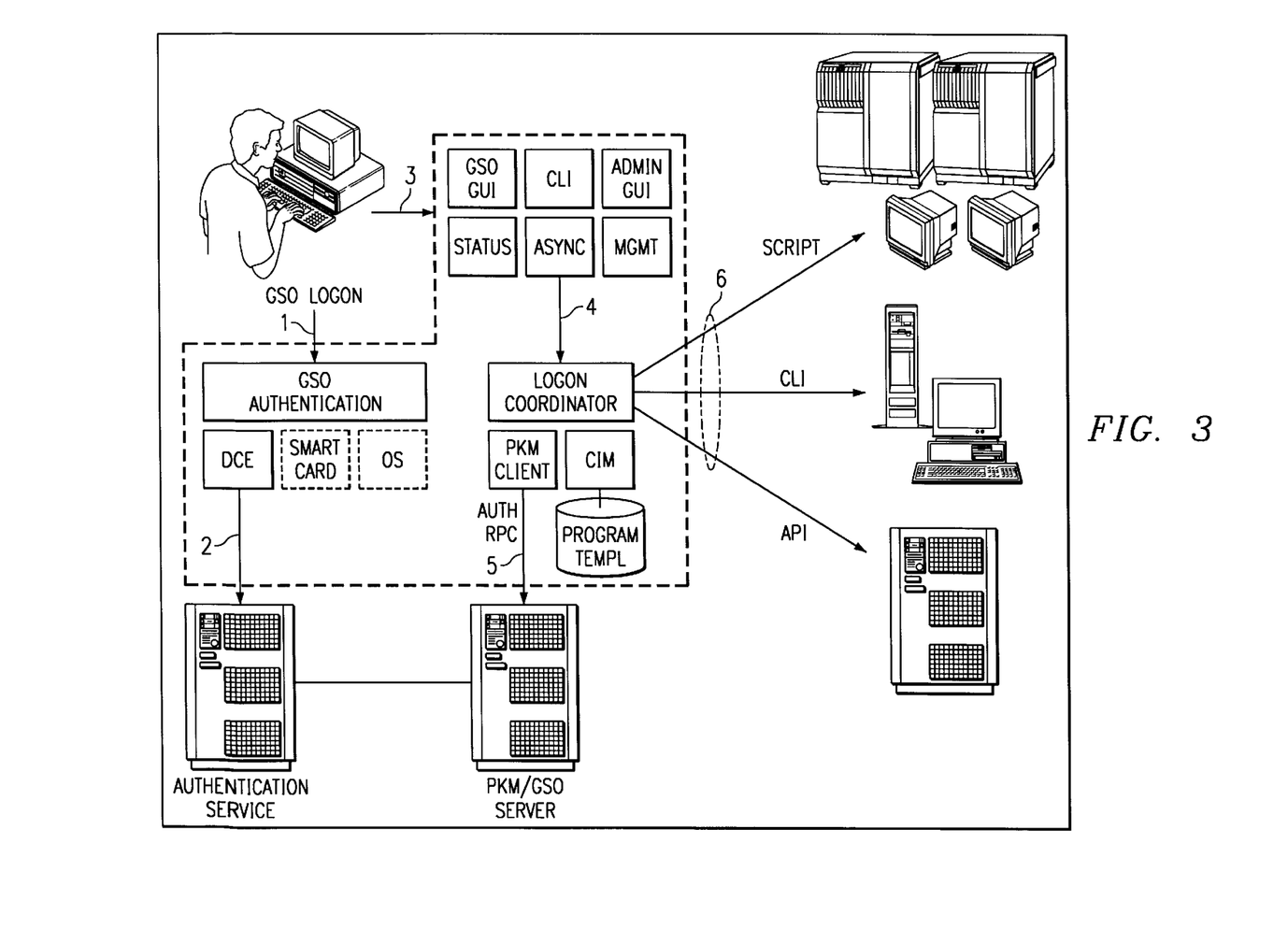
FIG. 3 is a representative single sign-on transaction according to the present invention.
Figure 4:
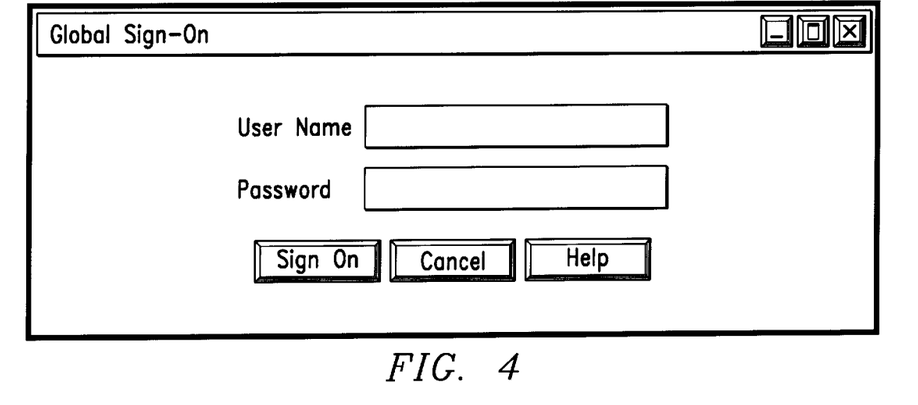
FIG. 4 is a representative logon interface screen for the SSO transaction of FIG. 3.

The expected runtime flow of a user interacting with the single sign-on (SSO) mechanism is illustrated in FIG. 3 and described as follows. At step 1, a user either logs in to a local operating system (if required by the local operating system) or logs on via a logon interface (if local logon is not required by the operating system). A representative logon interface screen is illustrated, for example, in FIG. 4. The user's local logon enables the authentication module (GSO Auth) on the local machine (if supported) to authenticate the user (step 2) to the authentication service that is integrated with the password storage service.

Figure 5:
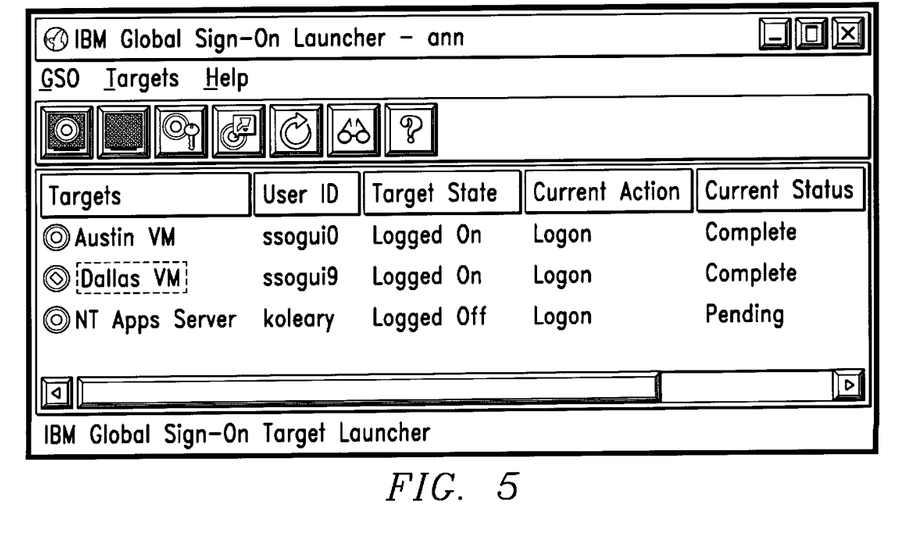
FIG. 5 is a representative GUI screen identifying the systems/applications for a particular user.

A successful authentication riggers the single sign-on graphical user interface (GUI) to display (at step 3) the systems/applications the user is able to logon to and the status of the logon process. A representative GUI screen display is illustrated in FIG. 5. The GUI also calls the logon coordinator on the local machine (at step 4) to retrieve the user's configuration information and target configuration information. As described, the logon coordinator gets the user's information (which target systems and applications the user can signon to) and the passwords and keys for those systems/applications from the personal key manager. If the personal key manager is implemented as a remote service (or if the necessary information is located remotely), the personal key manager client (at step 5) gets the information in a secure fashion (i.e. the passwords/keys are encrypted for transmission). The credentials returned from the authentication module are used by the personal key manager client to ensure that the user who logged on to the mechanism is the user who retrieves the passwords.

The logon coordinator (step 6) then uses these passwords/ keys and the target logon information found in the configuration information manager (CIM) to sign-on to various target systems and applications, based upon the targets' own protocols and mechanisms. The logon coordinator preferably provides status information about the state of the logons and also allows some targets to be launched asynchronously (after the initial sign-on processing has completed).

This mechanism allows for different passwords for different target systems and applications without requiring the user to remember all such passwords. The user remembers only one password to log into the mechanism, which then performs the subsequent logging into the different system by acquiring the secret keys from the secured key manager (local or remote) This SSO mechanism enhances security as well as ease of use. It also enables the user to access existing system without having to create or to modify existing user definitions on those systems. As will be seen, the mechanism also allows a user to change his or her single sign-on password without requiring changes of the target keys/ passwords or vice versa. Target password changes can be made to one or more selected target systems.

Figure 6:
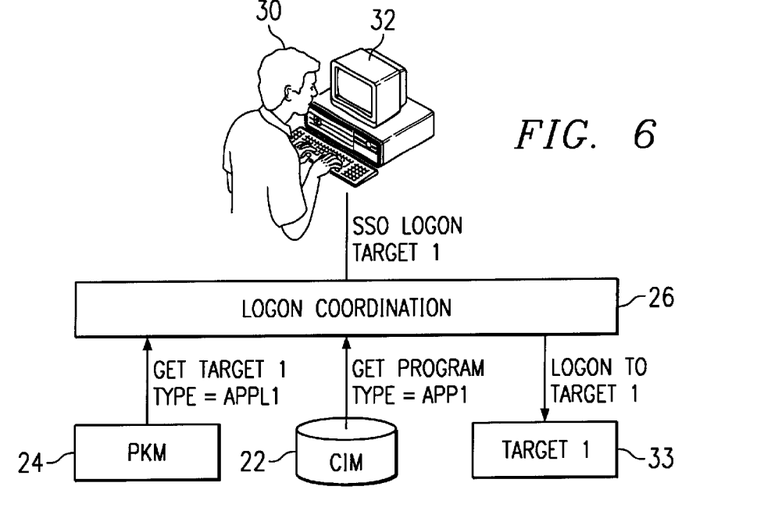
FIG. 6 is a high level illustration of the operation of the logon coordinator (LC) of the SSO mechanism.
Figure 7:
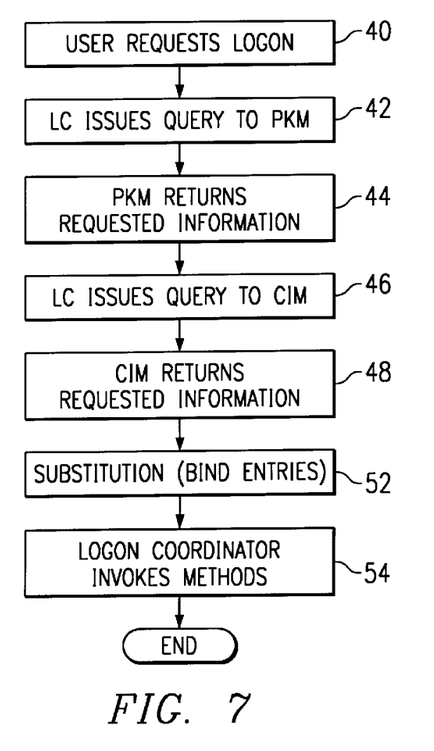
FIG. 7 is a flowchart illustrating the LC operation.
Figure 8:
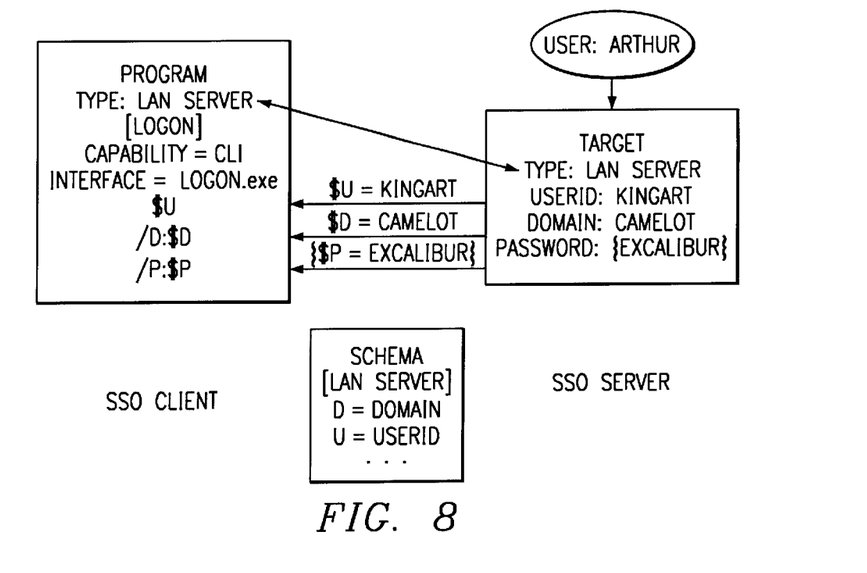
FIG. 8 illustrates how the logon coordinator performs a matching operation between PKM and CIM entries.

FIG. 6 is a high level illustration of the operation of the logon coordinator 26. FIG. 7 is a flowchart illustrating one preferred single sign-on method, which may be suitably implemented in a computer program. The routine begins at step 40 when a user 30 (at a workstation 32) requests a logon to a given application (Target 1) 33. In response, the routine continues at step 42 with the logon coordinator 26 issuing a query to the PKM 24 for the information regarding the user's "key" (which, as described above, may include the username, password, and any other application environment-specific information as described above). At step 44, the information is returned to the logon coordinator. Then, the routine continues at step 46 with the LC issuing a query to the CIM to obtain the program information. At step 48, the program information is returned to the LC. The information retrieved from the CIM 22 for the particular application determines how to logon to the application (e.g. what type of invocation to make, what actual invocation, and the like). At step 52, the logon coordinator 26 substitutes given data received from the PKM into substitution variables in the invocation strings returned from the CIM. In particular, the logon coordinator performs a matching operation; for each PKM target entry, the coordinator determines whether there is a corresponding CIM entry. If so, step 52 binds the two entries together. This is illustrated in FIG. 8. At step 54, the logon coordinator 2E invokes the logon method(s) defined by and stored in the CIM. This completes the processing.

Generalizing, the logon coordinator (LC) thus takes the data from the personal key manager (PKM) and the directives in the CIM and interprets the data, together with current state information, to perform a given action. Such action is carried out with respect to the users' systems and applications and includes for example, a logon operation, a change password operation, or a logoff operation.

Figure 9:
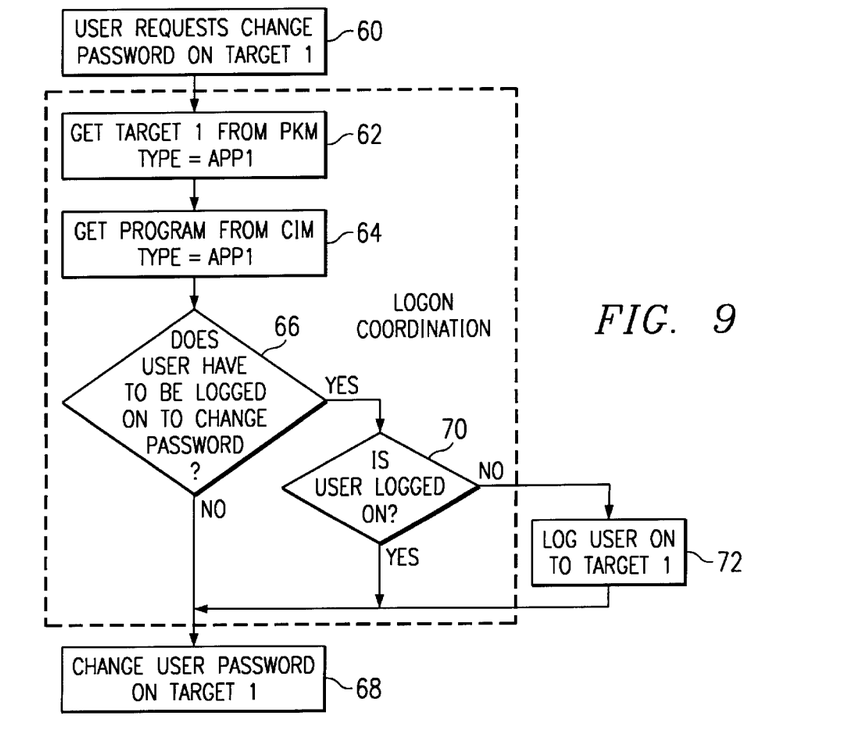
FIG. 9 is a flowchart of a change password operation.

If the user requests a change password operation, the LC makes the correct invocation to change the password and coordinates the password update in the PKM. Continuing with the above-described example (involving Target 1) a representative flowchart of this function is illustrated in FIG. 9. By way of brief background, the logon coordinator preferably maintains state information for a given user and application, a "user target", to help coordinate and execute future operations. By looking at the current state of a user target and interpreting data in the PKM entry and the CIM, the LC can determine which operations are required to satisfy an SSO request. For example, the CIM can specify that a user should be logged on to an application before performing a change password operation. Therefore, the LC would keep track of the logon state of a user target to determine what operations are required to satisfy a change password request. If the user were not logged on to the application, the LC would perform a logon operation and then perform the change password operation.

The flowchart of FIG. 9 is illustrative of the process. The routine begins at step 60 when the user desires to change a password for his/her Target 1. At step 62, the routine gets Target 1 information from the PKM; here, the target type is App1. The routine then gets the corresponding program of the given type from the CIM at step 64. A test is then performed at step 66 to determine whether the user has to be logged on to change his/her password. If not, the routine continues at step 68 and the user password is changed. If, however, the outcome of the test at step 66 is positive, a test in performed at step 70 to determine whether the user is logged on. If the outcome of the test at step 70 is positive, the routine branches to step 68; otherwise, the user is first logged on at step 72. This completes the processing.

A combination of the data model described and the LC implementation thus provides "free seating" support. Free seating means that the user does not have to specify a particular program on the client when using the SSO mechanism to log onto a particular target. The free seating method allows the user to install any program on his or her client machine and then have the logon coordinator pick the appropriate cone to logon to the target. The LC preferably does this by examining the "target type" associated with the programs on the client and the target the user is trying to access. If the program has the same target type as the target, then the LC knows it can use that program to access that target. This means that the user can logon to a target if any program on the system matches the target type, rather than needing a fixed program to do the logon.

For example, a user may have a target "HOST1" of type "3270 Emulator." On the machine on the user's desktop, the user may have the "telnet3270" program, which is of the type "3270 Emulator" available to logon to HOST1. On the user's laptop, the user may have the IBM Personal Communicator program available, which is also a 3270 Emulator, to logon to that target. Wren the user uses the SSO mechanism on the desktop machine, the LC will use telnet3270 as the 3270 Emulator to logon to HOST1; on the laptop, IBM Personal Communicator will be used. These examples, of course, are merely representative of the inventive free seating support concert.

The generic PKM data model described above may be implemented in many ways including, without limitation, DCE client/server, a real smartcard, a soft (disk-based) virtual smartcard, or the like. One advantage of using an implementation-independent PKM API as described herein is that different mechanisms may be pluggable without any modification to other SSO application programs. Moreover, multiple mechanisms can be configured on one machine and a user has the option to choose a specific one.

A representative PKM is implemented in a known DCE Security Registry architecture conforming to The Open Group DCE Standard. Familiarity with DCE security mechanisms is presumed in the following discussion.

Figure 10:
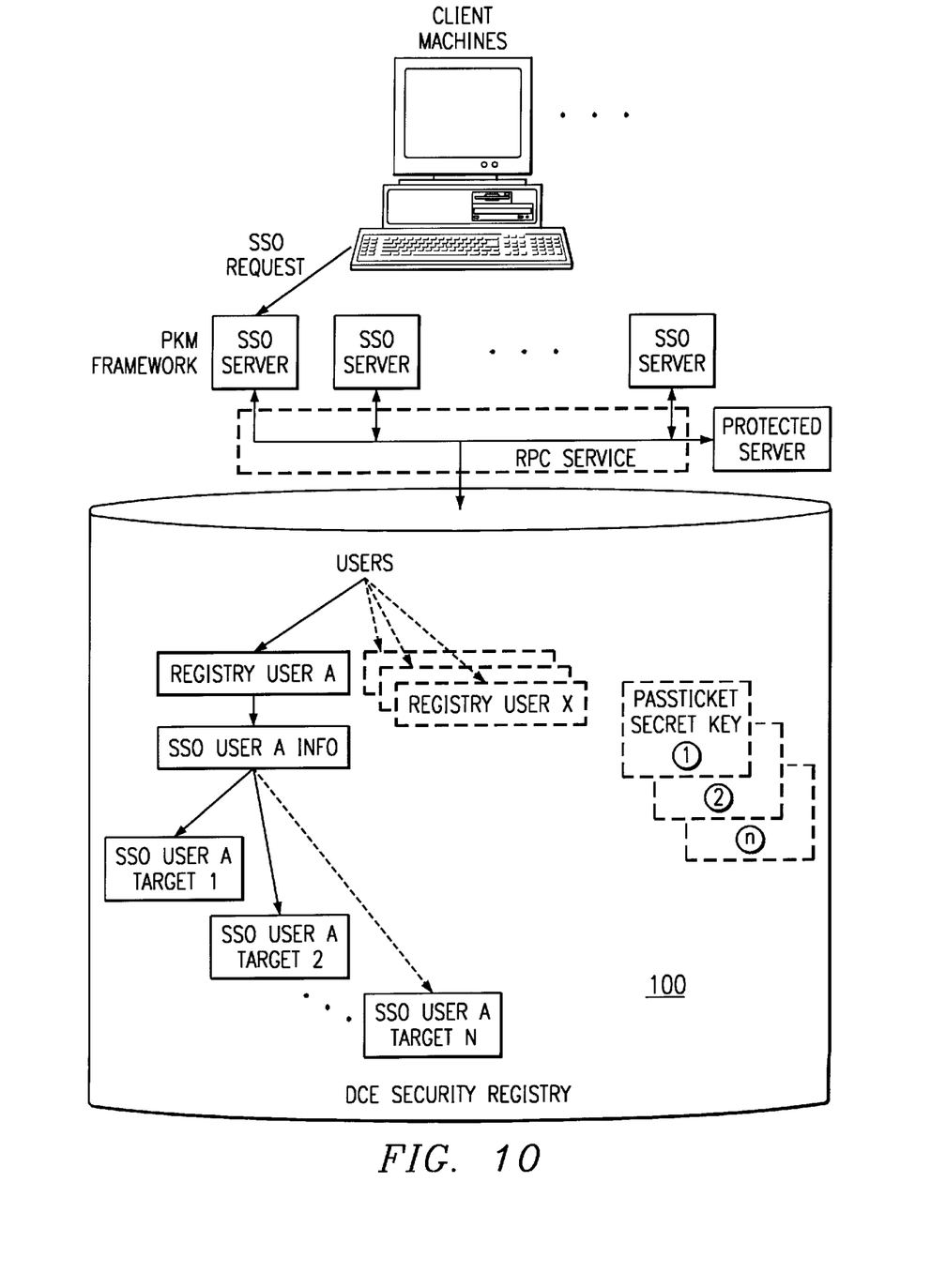
FIG. 10 is a block diagram of a representative multiple SSO server implementation and a DCE Security Registry for supporting the PKM data model.

FIG. 10 illustrates the basic PKM architecture, which may be distributed across multiple machines in the domain. In particular, it is first assumed that multiple SSO servers 100a–n are configured and running in the domain. Multiple PKM servers are replicated on different machines, e.g., for performance and scalability. Each server preferably performs the same functions. Thus, preferably there is no master/slave relationship among them. As also seen in FIG. 10, user specific target configuration data and target passwords (together, PKM data) of SSO users are stored in a database 102, which may be a DCE extended registry database (ERA). When the PKM server modifies data in the master registry database 102, data consistency between the master and slave registries is achieved automatically by the data duplication mechanism in registries. However, no encryption facilities are usually provided by the registry for data stored in the database 102. To avoid target passwords being revealed to SSO administrators (or others), the password field is preferably encrypted with a master key managed by the PKM server before the whole target is stored in the database 102. Further, because multiple SSO servers can be configured for load balancing, a local copy of this master key preferably exists in each one of SSO servers. The master key thus is generated automatically by one server machine and "waited to be pulled" by other servers when they are up and running. A simple "group" mechanism provided by DCE (or some other similar mechanism depending on the architecture implementation) is used to tell which servers possess the valid master key.

The PKM data model elements were described above. The groups preferably include: target name, target attributes, key information, user configuration and target class. The target name is the identifier used to distinguish a target from other targets. The target attributes include target type, domain/ host/application names and target user name. The key information contains the password of the user for the target and the type of the key derived from the password (e.g., a public key, a secret key, or the like). The user configuration is the user's own configuration preference when the user logons to and logoffs from the target. The target class defines whether the target is a password-based target or a passticket-based target. If it is a passticket-based target, a passticket-protected (e.g., RACF) application server's name must usually be specified. The above-described generalized data model enables all kinds of targets to be defined through the PKM API. Thus, in certain circumstances, not all the fields/attributes may have values for each target because only a subset of attributes may be sufficient or meaningful for defining a specific, real target. In addition, because a passticket for a protected server is dynamically-generated on demand, no password is required to be stored with a passticket-based target.

PKM is preferably implemented as a client/server application in a distributed computing environment (e.g., Open Group DCE) as described above. The PKM server preferably implements all PKM functions. In this illustrative DCE implementation, all target data is stored in DCE registry's ERA and the server accesses the data on behalf of each user on a client machine. Therefore, the PKM API is mapped to a set of remote procedure calls (RPCs) on each client machine using the DCE RPC mechanism. RPCs with different protection levels (e.g., privacy or integrity) and different properties (e.g., idempotent or at-most-once) are employed to pass data, depending on the API's security and semantic requirements. When the server receives a client's request, a thread is created to access the data in the ERA. If the request is a create, update, or delete operation, a write to the master registry is required. If the request is a query operation, a read from any slave registry is sufficient to carry out the operation. Continuing with this DCE example, if a password-based target is queried, the password is retrieved from ERA. If a passticket-based ticket is queried, one more RPC is used to retrieve the secret key shared between the PKM server and the passticket server. The server then generates the passticket based on the secret key and other information configured for the target.

One of ordinary skill will appreciate that the above PKM functions may also be implemented in other distributed environments besides Open Group DCE. Thus, the illustrative embodiment should not be construed to limit the present invention.

Summarizing, the SSO approach described above provides several advantages. The framework-based SSO mechanism enables all kinds of targets to be defined for any user. Different PKM implementations can be( pluggable using the generic API without any changes to the programs using the PKM service. The described implementation (e.g., within a DCE architecture) makes user authentication, secure communication and data management mush easier.

One design consideration of a single sign-on system is the network authentication between a single sign-on user and the single sign-on centralized server, as well as the secrecy of passwords and keys transmitted across networks. These two requirements can be achieved by utilizing the authentication and message encryption functions provided by any security service (such as DCE's Kerberos or NetSP's KryptoKnight). To make the SSO components portable to different security environments, the design and implementation of the SSO components preferably is independent of the underlying authentication protocols and encryption mechanisms. This is a significant advantage of the present invention.

The program template file (PTF) as previously described is a convenient mechanism for telling SSO how to interact with a given application or sub-system to perform SSO-related operations. The key benefit of the PTF is that it enables applications to be plugged into SSO without changing the SSO code itself and without requiring any programs to be written to plug into he new application.

As described above, the PTF file preferably contains the following relevant information:

Program name identifies the program/application being integrated.

Target type specifies the type of target the PTF describes. The target type is used by other parts of SSO to specify an application of this type.

Methods describes how SSO should perform SSO operations.

A stanza for each method exists which describes how SSO should perform the particular operation for that method. An example of the LOGON method for the LAN Server Application follows (see FIG. 8):

[LOGON]

capability=CLI interface=Logon.exe $U $P /D:$D $rc_{13}$ success=0 rc_error=2100–2900, 3010–3240

In this example, the method SSO would use to logon to LAN Server is specified by the capability (CLI for command line interface, API for application programming interface). The actual command to be executed is specified in the interface. The symbols $U, $P and $D represent username, password and domain, respectively. It is expected that SSO will replace those symbols with the username, password and domain the user is trying to logon to, as indicated in FIG. 8. Return codes from the interface are associated with buckets (rc_success, rc_error, etc.), allowing the appropriate action to be taken based the bucket into which the return code falls.

Other methods preferably include START, LOGOFF, and CHANGE_PASSWORD. Additionally, the PTF describes additional application behavior such as whether the application needs to be started prior to logon, whether the LOGON method must be invoked before the CHANGE_PASSWORD method, location information where the application exists on the physical machine, and method retry and timeout values.

The following is a representative PTF:

[MAIN]

default_program_name (required): must be enclosed in quotes. SSO uses this as the default for program name in the Add Program user interface.

default_program_name="example"

format_version (required) should rot be changed. SSO uses it to determine which version of SSO you used to create this program template. If you need to specify your own versions, use comments to do so.

format_version=1.0 target_type (required): is case sensitive. target_type must match the [TARGET_TYPE] defined in a file called a schema file. Use a predefined SSO target type or create a new one. To create a new one, specify it with no spaces and no quotes to guarantee uniqueness:

type@DNS-name target_type=

[SETTINGS]

logon_sequence (required) : defines the sequence in which the program expects start and logon operations to occur.

Valid values are:

prompt: The program preferably requires the start and logon to be performed in the same operation. The START section is ignored. The LOGON section is required.

start_required: The program preferably is started before logon can occur. Both START and LOGON sections are usually required.

no_start_required: The program can be logged on without being started first and can be started without subsequently logging on. Both START and LOGON sections are optional.

logon_sequence= change_password_sequence: typically required, defines the sequence in which the program expects the logon and change password operations to occur. Valid values are:

logon_required: The program requires a logon before the password can be changed. Be aware of the following:

If the target is not logged on and change_password_sequence=Logon_required, the LOGON_AND_CHANGE_PASSWORD interface string is used to log on to the target and change the password.

If the target is not logged on, the change_password_sequence is set to Logon_required, and there is no Logon_and_change_password interface string, the LOGON interface string is used to log on to the target, and then the CHANGE_PASSWORD interface string is used to change the password.

If the target is already logged on, the CHANGE_PASSWORD interface string is used to change the password.

no_logon_required: The program allows a password to be changed whether the user is logged on or not. The CHANGE_PASSWORD interface string is used to change the password.

change_password_sequence=

You should define either minimum_timeout or maximum_timeout. They both default to 0, which implies an infinite wait. If you define both, define minimum_timeout to be less than maximum_timeout.

minimum_timeout is the minimum amount of time, in seconds, that SSO should wait for a function to complete before returning.

minimum_timeout applies to command line interfaces only. It is intended to be used for targets that return successfully right away but require initialization time before a subsequent operation, such as LOGON, can be performed.

maximum_timeout is the maximum amount of time, in seconds, that SSO should wait for a function to complete before returning. maximum_timeout applies to both API and command line interfaces. It is intended to prevent a hang situation when a running process does not return when expected.

minimum_timeout= maximum timeout= directory (optional): defines the directory containing the files specified in the interface string definitions. In most cases, this is the default installation directory. If you do not specify a default directory here, you should specify the fully-qualified file names in the interface string definitions.

directory= retries (optional): defines the number of times to retry an operation before returning an error. Retries are attempted, for example, when a return code defined in the rc_error return code bucket is received.

retries=

The Interface Sections

Interface sections define the interfaces SSO will use to invoke your program to access the particular target type defined in the [SETTINGS] section. In general, the interfaces define either an API call or a command line interface and the parameters expected. You can use substitution variables in the parameters to represent target- and program-specific information needed to invoke the function.

Substitution Variables

Substitution variables are reserved variables for target-specific information. The following substitution variables are commonly used for all target types:

$U The target userid.

$P The target password.

$N A user's new target password. SSO uses this value only in the CHANGE_PASSWORD and LOGON_AND_CHANGE_PASSWORD interfaces.

The following substitution variables preferably are used in some combination to identify the target system. Their exact meaning is defined in the schema file for the particular target type supported:

$A The target application name.

$D The target domain name.

$H The target host name.

$M, a reserved substitution variable, is a special message output parameter that lets you specify a text message that can be returned by the interface. SSO will write this message to the SSO log. This parameter may be used to develop wrapper code to improve the integration of a given program with SSO. It may be used to give the user information should the interface not complete successfully when invoked by SSO.

Unreserved Program-Unique Variables

Preferably, there are seven other substitution variables—$1 through $7—that allow one to specify other program-specific information. If any of these variables are used, a section in the program template file may be included to define them.

The capability keyword describes the type of programming interface required to start the program supported by this program template. Valid values are:

API16 for 16-bit APIs.

API32 for 32-bit APIs.

CLI for command line.

For example, capability=API32

The interface string defines how to invoke the API or command line interface for this function.

Specifying an API Interface interface="<path-filename combo>function_return_type function_name (parm1,parm2, . . . )"

Specify the interface string, which preferably cannot be longer than 1024 characters, on one line. There are preferably no continuation characters. Enclose the string in double quotes. Enclose the entire executable path and file name combination (path-filename combo) in less than (<) and greater than (>) symbols. The interface is _System linkage.

Here is a representative description of the interface parameters:

function_return_type=int, uint, long, or ulong function_name is the API entry point.

parm1, parm2, and so on are parameters specified as:

[parm_direction] parm_type parm_value

[parm_direction]=[in]

[out,max_is(size)]

size is the number of bytes required to hold the output data from the function, such as $M in the example that follows.

parm_type=int, int*, uint, uint*, short*, ushort*, long, long*, ulong, ulong*, char*, or uchar* parm_value=value value is either a "value possibly containing spaces enclosed in double quotes" or a substitution variable.
API Interface Example
capability=API32
interface="<c:\appl\logon_ops.dll>int appLogon([in]char* stringval, [in]ushort $2, [in]char* $D, [out,max_is(512) char* $M)"
Specifying a Command Line Interface
capability=CLI
interface="<path-filename combo>parm1_value parm2_value . . . "
Enclose the entire interface string in double quotes. Enclose the entire executable path and file name combination (path-filename combo) in the less than (<) and greater than (>) symbols.
parm1_value=value
parm2_value=value
value is either a "value possibly containing spaces enclosed in double quotes" or a substitution variable.
CLI Interface Example
capability=CLI
interface="<c:\ibmlan\netprog net2.exe>$3"
Return Codes
Identify the category into which the return codes fall. Specify return codes as:
  A list of return codes separated by commas
  A range of return code values
  A combination of both
rc_success: The operation performed on the target was successful.
rc_information: The operation performed on the target was successful and the target returns information in the form of a null-terminated character string. SSO logs this character string in the default error log.
rc_chgpwd_error: A change password operation is necessary. SSO notifies the user.
rc_credentials expired: The user's credentials to the target have expired. Certain types of targets have time limited credentials. If the credentials have expired, the user might have to reissue a logon to that target.
rc_error: The operation performed on the target produced an error, but the operation is worth retrying. SSO retries the operation until it reaches the maximum number of retries specified when the program was added. SSO displays status messages to the user while it retries the operation and at the point when it reaches the maximum limit of specified retries.
rc_severe_error: The operation performed on the target produced an error so severe that there is no recovery. SSO does not retry the operation.
[START]
[START] defines the interface to start the program.
capability=
interface=
rc_success=
rc_information=
rc_chgpwd_error=
rc_credentials_expired=
rc_error=
rc_severe_error=
[LOGON]
[LOGON] defines the interface to log on to the target.
capability=
interface=
rc_success=
rc_information=
rc_chgpwd_error=
rc_credentials_expired=
rc_error=
rc_severe_error=
[CHANGE_PASSWORD]
[CHANGE_PASSWORD] defines the interface to change the user's target password.
capability=
interface=
rc_success=
rc_information=
rc_chgpwd_error=
rc_credentials_expired=
rc_error=
rc_severe_error=
[LOGON_AND_CHANGE_PASSWORD]
[LOGON_AND_CHANGE_PASSWORD] defines the interface to log on to the target and change the user's password.
capability=
interface=
rc_success=
rc_information=
rc_chgpwd_error=
rc_credentials_expired=
rc_error=
rc_severe_error=
[LOGOFF_FORCE]
[LOGOFF_FORCE] defines the interface to force logging off of the target.
capability=
interface=
rc_success=
rc_information=
rc_chgpwd_error=
rc_credentials_expired=
rc_error=
rc_severe_error=
[LOGOFF_GRACEFUL]
[LOGOFF_GRACEFUL] defines the interface to log off gracefully (without loss of data) from the target.
capability=
interface=
rc_success=
rc_information=
rc_chgpwd_error=
rc_credentials_expired=
rc_error=
rc_severe_error=
Substitution Variables
Use the unreserved substitution variables, $1 through $7, in the interface sections to represent program-specific information. Then, include a section, [$1], [$2], on so on, to define each one used.
[$1]
value=how is this specified?
label="text label" or ???help="text string" or ???
Define a value for each substitution variable using the value keyword. By using substitution variables, you simplify your interface sections.
One can use substitution variables for information needed from the user. In this case, omit the value keyword or use it to specify a default value. Then, define values for the label and help keywords. SSO uses these to build a user interface (entry fields) for collecting the information from the user. SSO stores the value of the substitution variables, either specified or collected from the user, in the program information database on the client machine.
  Summarizing, single sign-on is facilitated by storing all the passwords and keys belonging to a user in secure storage (either in local storage, a centralized password service, or in a smartcard), so that the user needs to remember only one ID and password. The single sign-on ID and password is then used to authenticate the user. Upon authentication, the mechanism securely retrieves all the passwords for a user from the secure storage and automatically (without any additional user intervention) issues sign-ons to each application the user is authorized to access.

The present invention provides a framework that allows the PKM and the CIM implementations to be separable from the rest of the single sign-on code. The functions provided by the aforementioned components are preferably implemented via a high-level API. Thus, a new implementation (such as Lotus Notes) can be added without causing a major redesign. This mechanism provides a logon coordination framework so that each specific target can be easily plugged into the single sign-on logon coordinator framework. This facilitates the support of the vast range of client server targets.

The present invention enables efficient access to heterogeneous networks at reduced costs to thereby increase productivity for end-users and system administrators. These advantages are achieved by enabling users to sign-on once with a single ID and password to access business applications and data. The design goals achieved are ease of use, secure authentication of users, and logon coordination to multiple applications.

The present invention provides numerous other advantages. It is based on an easy to use interface, and provides a consistent look and feel across operating systems. The tool is also advantageous in that it integrates with operating system logons, is based on open standards, supports "one time" passwords, and is capable of leveraging existing security infrastructures.

One of the preferred implementations of the various modules described is as a set of instructions in a code module resident in the random access memory of a computer. Some of the framework functionality is supported in a client machine, and some of the framework functionality is supported in one or more servers. Until required by the computer, the set of instructions may be stored in another computer memory, for example, in a hard disk drive, or in a removable memory such as an optical disk (for eventual use in a CD ROM) or floppy disk (for eventual use in a floppy disk drive), or even downloaded via the Internet.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, although the invention has been described in terms of a preferred embodiment in a specific network environment, those skilled in the art will recognize that the invention can be practiced, with modification, in other and different network architectures with the spirit and scope of the appended claims. Moreover, the logon coordinator may be useful in other than single sign-on (SSO) environments.

Having thus described our invention, what we claim as new and desire to secure by letters patent is set forth in the following claims.

What is claimed is:

1. A method of single sign-on to multiple target resources in a computer enterprise environment, wherein at least some target resources normally require a given logon process to access applications on the target resource, comprising the steps of:

for each of a set of target resources having different logon processes, storing configuration directives identifying the given logon process and methods required to access a particular application on the target resource;

for each of a set of users, storing user-specific information that enables the user to access and logon to one or more of the target resources; and during a logon attempt by a given user with respect to a target application on one of the set of target resources, coordinating given user information with at least one given configuration directive to enable the given user to logon to the target application without specifying the given logon process.

2. The method as described in claim 1 further including the step of validating a user id/password of the given user during the logon attempt.

3. The method as described in claim 1 further including the step of storing state information associating the given user with the given target application.

4. The method as described in claim 3 further including the step of using the state information stored to facilitate access to the target application in a subsequent session.

5. The method as described in claim 3 further including the step of using the state information to determine whether the given user has authority to perform a given operation.

6. The method as described in claim 5 wherein the given operation is a change password operation.

7. The method as described in claim 6 further including the step of performing the given operation.

8. The method as described in claim 1 wherein a particular configuration directive is generated by a provider of a given target application.

9. A method of enabling single sign-on access to a target application on a target resource in a distributed computer enterprise, comprising the steps of:

generating a configuration directive identifying a given logon process and any associated methods required to access the target application on the target resource;

for each of a set of users, storing user-specific and application-specific information that enables the user to access and logon to one or more target resources; and during a session, coordinating given user information with the configuration directive to enable the given user to perform a given action with respect to the target application without specifying the given logon process and the application-specific information.

10. The method as described in claim 9 wherein the given action is a user logon to a target resource.

11. The method as described in claim 9 wherein the given action is a change password operation.

12. The method as described in claim 9 wherein the configuration directive is defined by a template file.

13. The method as described in claim 9 wherein the configuration directive is stored in a local database.

14. The method as described in claim 9 wherein the user-specific and application-specific information is stored in a database.

15. A system architecture for enabling access to a target application on a target resource in a distributed computer enterprise, comprising:

means for storing at least one configuration directive identifying a given logon process and any associated methods required to access the target application on the target resource;

means for storing user-specific identifying information for each of a set of users, the user-specific identifying information enabling a given user to access and logon to one or more target resources; and means for coordinating given user-specific identifying information with the configuration directive to enable the given user to perform a given action with respect to the target application without specifying the given logon process.

16. The system architecture as described in claim 15 wherein the given action is a user logon to a target resource.

17. The system architecture as described in claim 15 wherein the given action is a change password operation.

18. The system architecture as described in claim 15 wherein the given action is a logoff from a target resource.

19. The system architecture as described in claim 15 wherein the means for storing the configuration directive is a database.

20. The system architecture as described in claim 15 wherein the means for storing the user-specific identifying information is a database.

21. A computer program product in a computer-readable medium operable on a computer for enabling access to a target application on a target resource in a distributed computer enterprise, comprising:

means running on the computer for storing at least one configuration directive identifying a given logon process and any associated methods required to access the target application on the target resource;

means for retrieving user-specific identifying information for a given user to enable the given user to access and logon to one or more target resources; and means for coordinating the retrieved user-specific identifying information with the configuration directive to enable the given user to perform a given action with respect to the target application without specifying the given logon process.

22. A computer connectable in a distributed computer enterprise, comprising:

at least one processor;

a memory;

a computer program supported in the memory and executable by the at least one processor for enabling access to a target application on a target resource in the distributed computer enterprise, the computer program comprising:

means for storing in the memory at least one configuration directive identifying a given logon process and any associated methods required to access the target application on the target resource;

means for retrieving user-specific identifying information for a given user to enable the given user to access and logon to one or more target resources; and means for coordinating the retrieved user-specific identifying information with the configuration directive to enable the given user to perform a given action with respect to the target application without specifying the given logon process.

\* \* \* \* \*

UNITED STATES PATENT AND TRADEMARK OFFICE
CERTIFICATE OF CORRECTION

PATENT NO. : 6,178,511 B1
DATED : January 23, 2001
INVENTOR(S) : Cohen et al.

It is certified that error appears in the above-identified patent and that said Letters Patent is hereby corrected as shown below:

Column 10,
Line 25, please delete "$rc_{13}$" and insert -- $rc_-$ --.

Signed and Sealed this

Twenty-sixth Day of July, 2005

JON W. DUDAS
*Director of the United States Patent and Trademark Office*